US008312702B2

(12) United States Patent
Bart et al.

(10) Patent No.: US 8,312,702 B2
(45) Date of Patent: Nov. 20, 2012

(54) OIL RECOVERY DEVICE

(75) Inventors: Jacques René Bart, Soisy sur Seine (FR); Serge René Morreale, Guignes (FR); Jean-Luc Soupizon, Vaux le Penil (FR)

(73) Assignee: SNECMA, Paris (FR)

( * ) Notice: Subject to any disclaimer, the term of this patent is extended or adjusted under 35 U.S.C. 154(b) by 832 days.

(21) Appl. No.: 12/364,053

(22) Filed: Feb. 2, 2009

(65) Prior Publication Data

US 2009/0199534 A1 Aug. 13, 2009

(30) Foreign Application Priority Data

Feb. 13, 2008 (FR) ..................................... 08 50899

(51) Int. Cl.
*F02C 7/06* (2006.01)

(52) U.S. Cl. ....... 60/39.08; 415/111; 415/112; 415/113; 184/6.11; 184/43

(58) Field of Classification Search ................. 60/39.08; 415/111, 112, 113, 168.1, 168.2, 168.3, 168.4, 415/175; 184/6.11, 43
See application file for complete search history.

(56) References Cited

U.S. PATENT DOCUMENTS

| | | | | |
|---|---|---|---|---|
| 2,991,005 | A * | 7/1961 | Hall | 415/68 |
| 3,528,241 | A * | 9/1970 | Gill, Jr. et al. | 60/39.08 |
| 4,502,274 | A * | 3/1985 | Girault | 60/39.08 |
| 5,813,214 | A * | 9/1998 | Moniz et al. | 60/39.08 |
| 6,619,030 | B1 * | 9/2003 | Seda et al. | 60/226.1 |
| 6,883,303 | B1 * | 4/2005 | Seda | 60/226.1 |
| 7,097,415 | B2 * | 8/2006 | Bart et al. | 415/69 |
| 7,334,982 | B2 * | 2/2008 | Singh et al. | 415/111 |
| 7,658,077 | B2 * | 2/2010 | Earith et al. | 60/779 |
| 7,836,675 | B2 * | 11/2010 | Corattiyil et al. | 60/39.08 |
| 2006/0090449 | A1 * | 5/2006 | Moniz et al. | 60/226.1 |
| 2007/0028590 | A1 * | 2/2007 | Bart et al. | 60/39.08 |

FOREIGN PATENT DOCUMENTS

| | | | |
|---|---|---|---|
| EP | 0 852 286 | A2 | 7/1998 |
| EP | 1 316 676 | A1 | 6/2003 |
| EP | 1 653 045 | A2 | 5/2006 |

* cited by examiner

*Primary Examiner* — Ehud Gartenberg
*Assistant Examiner* — Michael B Mantyla
(74) *Attorney, Agent, or Firm* — Oblon, Spivak, McClelland, Maier & Neustadt, L.L.P.

(57) ABSTRACT

An oil recovery device is disclosed. The oil recovery device includes two bearing supports mounted on an inter-turbine casing, a first bearing and a second bearing mounted on the bearing supports, a low-pressure turbine journal mounted rotating with respect to the inter-turbine casing, a fixed ferrule, and an oil passage provided in the low-pressure turbine journal making it possible to discharge the oil inside the fixed ferrule. The ferrule is preferentially widened from the end at which the oil is discharged.

5 Claims, 4 Drawing Sheets

OIL RECOVERY DEVICE

FIELD OF THE INVENTION

The invention relates to an oil recovery device comprising an inter-turbine casing, whereon an upstream bearing support wherein a first hole is produced and a downstream bearing support wherein a second hole is produced, each equipped with a bearing, are mounted.

DESCRIPTION OF THE RELATED ART

In a turbojet engine according to the prior art, the low-pressure turbine shaft is centred at the rear by an inter-shaft bearing and by a bearing mounted on an exhaust casing. In the event of flooding of the bearing chamber by oil due to a failure of the oil recovery system, the oil passes through several labyrinths. It is recovered via a tube passing through the hub of the exhaust casing. It is then evacuated directly into a part, commonly referred to as a plug. This evacuation device is necessary in order to prevent the oil from overflowing onto the low-pressure turbine disk ferrules with the fire risks involved. However, this device is not suitable for all types of jet engines, particularly in the case of a jet engine wherein the bearing supports are grouped together on an inter-turbine casing, the exhaust casing no longer being structural but acting as a rectifying profile grid. In this configuration, the evacuated oil must pass through a rotating part, the low-pressure turbine journal.

A turbojet engine according to the prior art is also described in the document EP-A-1 316 676.

BRIEF SUMMARY OF THE INVENTION

The aim of the present invention is specifically to provide an oil recovery device which remedies these drawbacks.

These aims are achieved, according to the invention, in that the oil recovery device comprises a low-pressure turbine journal mounted rotating with respect to the inter-turbine casing, a downstream bearing support wall located after the second hole to guide the oil, the wall comprising a seal with a wall from the low-pressure turbine journal, a fixed ferrule and an oil passage provided in the low-pressure turbine journal making it possible to discharge the oil inside the ferrule.

Preferentially, the low-pressure turbine journal comprises a tab which extends longitudinally above one end of the ferrule in order to discharge the oil by means of centrifugation at said end of the ferrule and the ferrule is widened from the end whereon the oil is discharged.

Advantageously, the oil passage is located at the bottom of a cavity formed by conical shaped walls.

Due to these features, it is possible to install a system for preventing the effects of flooding of the chamber in a configuration of bearing supports grouped together on an inter-turbine casing.

In one specific embodiment, the oil recovery device comprises a rotating joint, a first and a second passage hole formed in the bearing supports secured on the inter-turbine casing, a bearing support wall located after the second hole, said wall comprising sealing means with a wall from the low-pressure turbine journal, the end of the bearing support wall overhanging the cavity formed by the conical shaped walls.

Moreover, the invention relates to a turbine aero engine which comprises an oil recovery device according to the present invention.

BRIEF DESCRIPTION OF THE SEVERAL VIEWS OF THE DRAWINGS

Other features and advantages of the invention will emerge further on reading the following description of an example of an embodiment given for illustrative purposes with reference to the appended figures. In said figures.

DETAILED DESCRIPTION OF THE INVENTION

Figure 1:
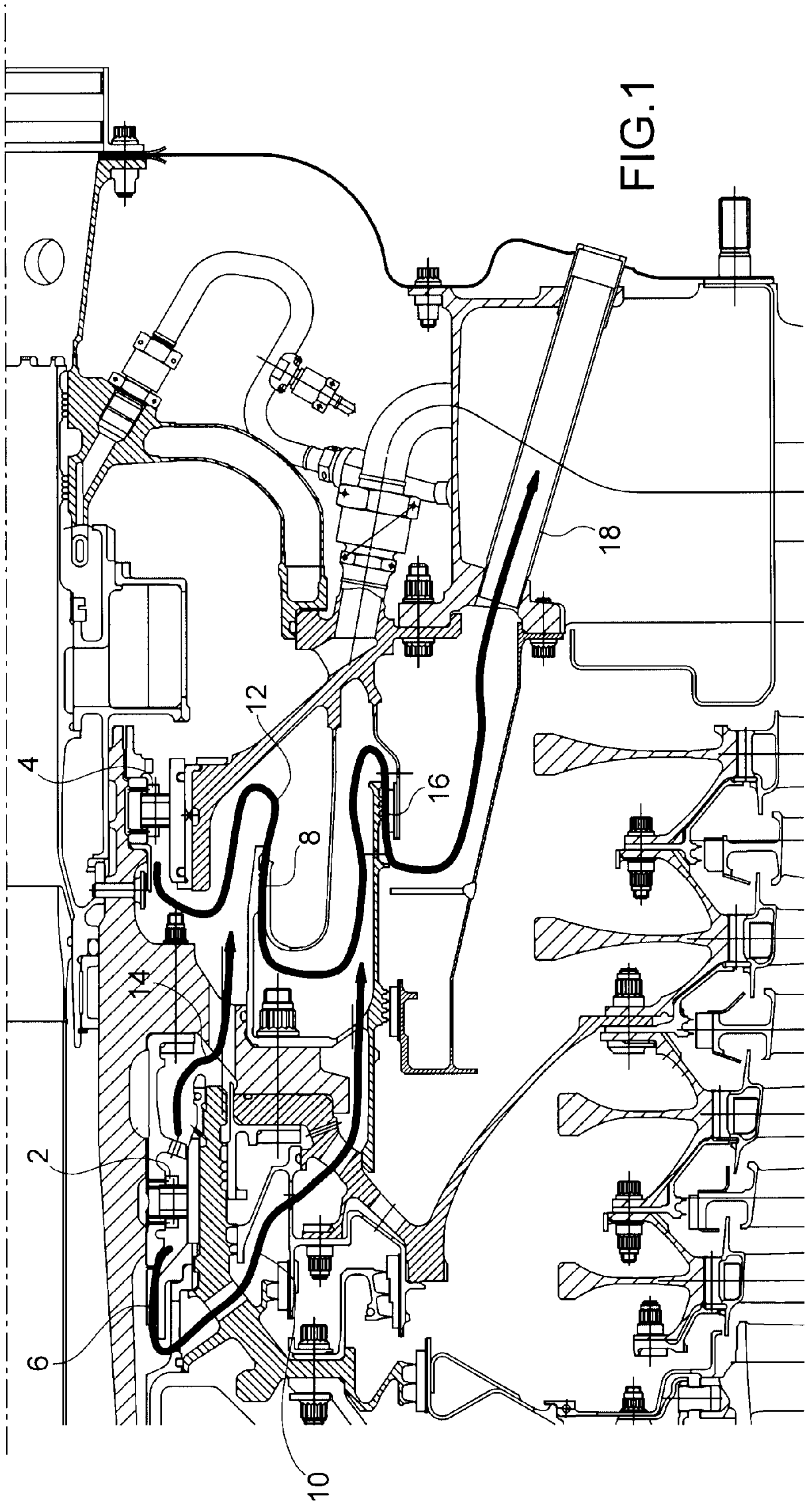
FIG.1 PRIOR ART
FIG. 1 is a sectional view of an oil recovery device according to the prior art.

In FIG. 1, a sectional view of an oil recovery device according to the prior art is represented. It comprises a first bearing 2 and a second bearing 4. Said bearings are arranged inside a chamber delimited by labyrinth seals. In the event of flooding of said chamber due to a fault in the oil recovery system, the oil flows through the labyrinths, as represented by the arrows 10 and 12. The oil also flows by the right (according to FIG. 1) of the bearing 2 as represented by the arrow 14 and it joins the flow represented by the arrow 12.

The oil passes through a further labyrinth seal 16 before being evacuated via an evacuation tube 18 into the plug (not shown).

This evacuation device prevents the oil from overflowing onto the low-pressure turbine disk flanges. However, this device is not suitable in the case of a jet engine wherein the bearing supports are grouped together on an inter-turbine bearing.

Figure 2:
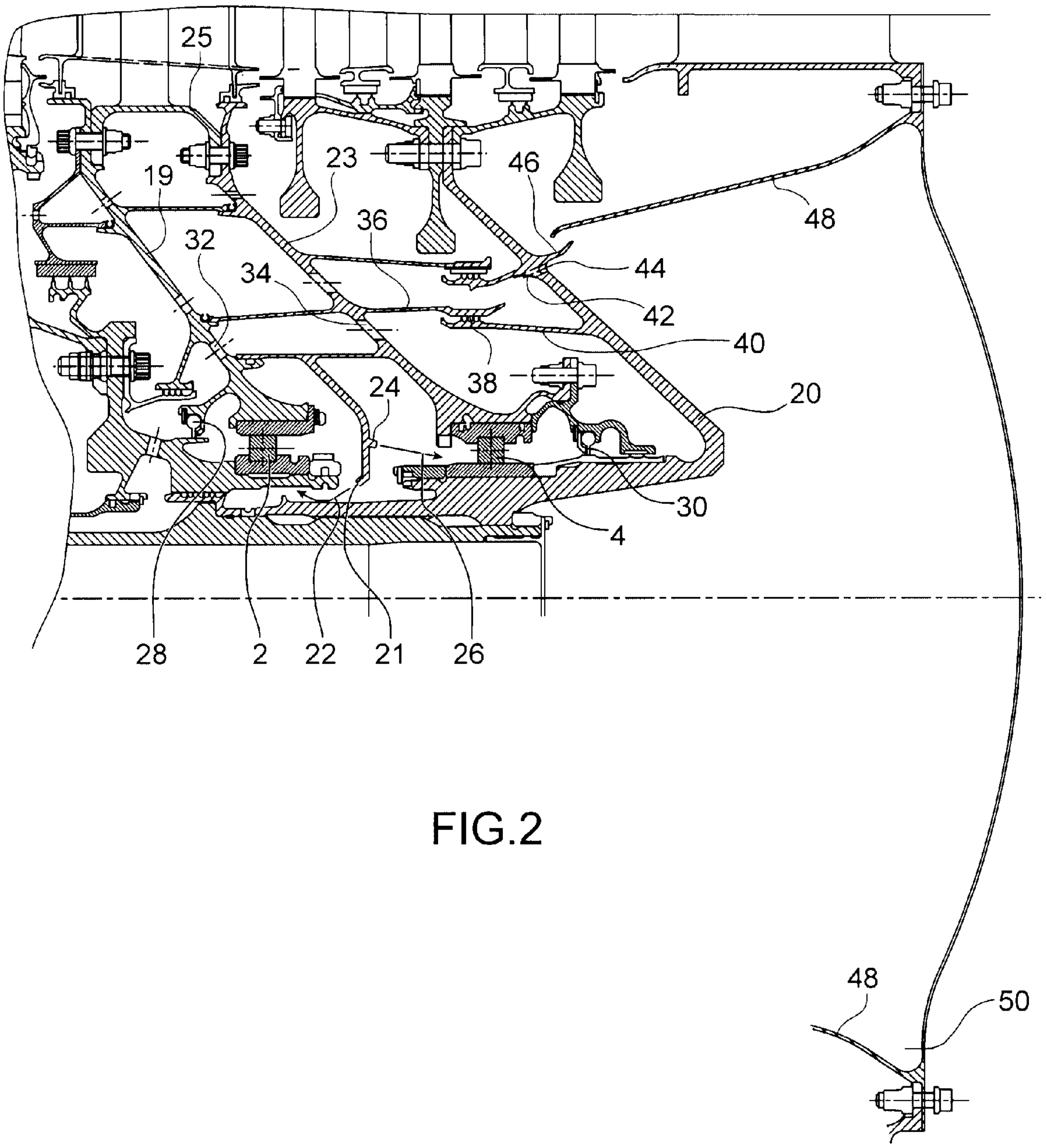
FIG. 2 is a sectional view of an oil recovery device according to the present invention.

In FIG. 2, a sectional view of an oil recovery system according to the present invention is represented. The first bearing 2 and the second bearing 4 are mounted on upstream 19 and downstream bearing supports 23 which are mounted on the inter-turbine journal 25. A low-pressure turbine journal 20 is mounted rotating with respect to the inter-turbine casing 25. The bearings 2 and 4 are lubricated by jets which spray an oil flow. The first bearing 2 is lubricated by the jet 21, as represented by the arrow 22 and the second bearing 4 is lubricated by the jet 24, as represented by the arrow 26.

In normal operation, the oil is evacuated as it is introduced via the jets 21 and 24. The oil is recovered in the lower section, between the upstream 19 and downstream bearing supports 23 and is conveyed in a pipe to the outside of the engine via a branch, also in the lower section, of the inter-turbine casing 25. However, a failure of the oil evacuation system may occur resulting in flooding of the chamber wherein the bearings are housed. Said chamber is delimited by a rotating joint 28 located in the vicinity of the bearing 2 and by a rotating joint 30 located in the vicinity of the bearing 4.

In the event of flooding of said chamber, the oil passes through the rotating joint 28, and then through a first hole 32 provided in the upstream bearing support 19, followed by a second hole 34 provided in the downstream bearing support 23. The oil is then guided on a wall 36 of the downstream bearing support 23. Said wall 36 comprises a sealing by a labyrinth seal 38 with a wall 40 from the low-pressure turbine journal 20. The oil passes the seal 38 and flows into a cavity 42 formed in the low-pressure turbine journal 20. Preferentially, the walls of said cavity are conical so as to favour the flow of the oil to the bottom of the cavity by means of centrifugation. Said bottom is specifically provided with a passage hole 44 enabling the oil to pass from one side of the low-pressure turbine journal to the other.

The low-pressure turbine journal also comprises a tab 46 which extends longitudinally above a fixed ferrule 48. The oil is thus centrifuged onto the ferrule 48. The oil is ejected and runs on the conical fixed ferrule 48, via the rotating "droplet disperser" 46, to the lower position where a hole 50 is located. The oil then flows into the plug (not shown).

It is noted that, in this way, the oil has passed a rotating part, the low pressure turbine journal 20. Said journal is in fact located between two fixed parts, i.e. the inter-turbine casing 25 and the ferrule 48.

Figure 3:
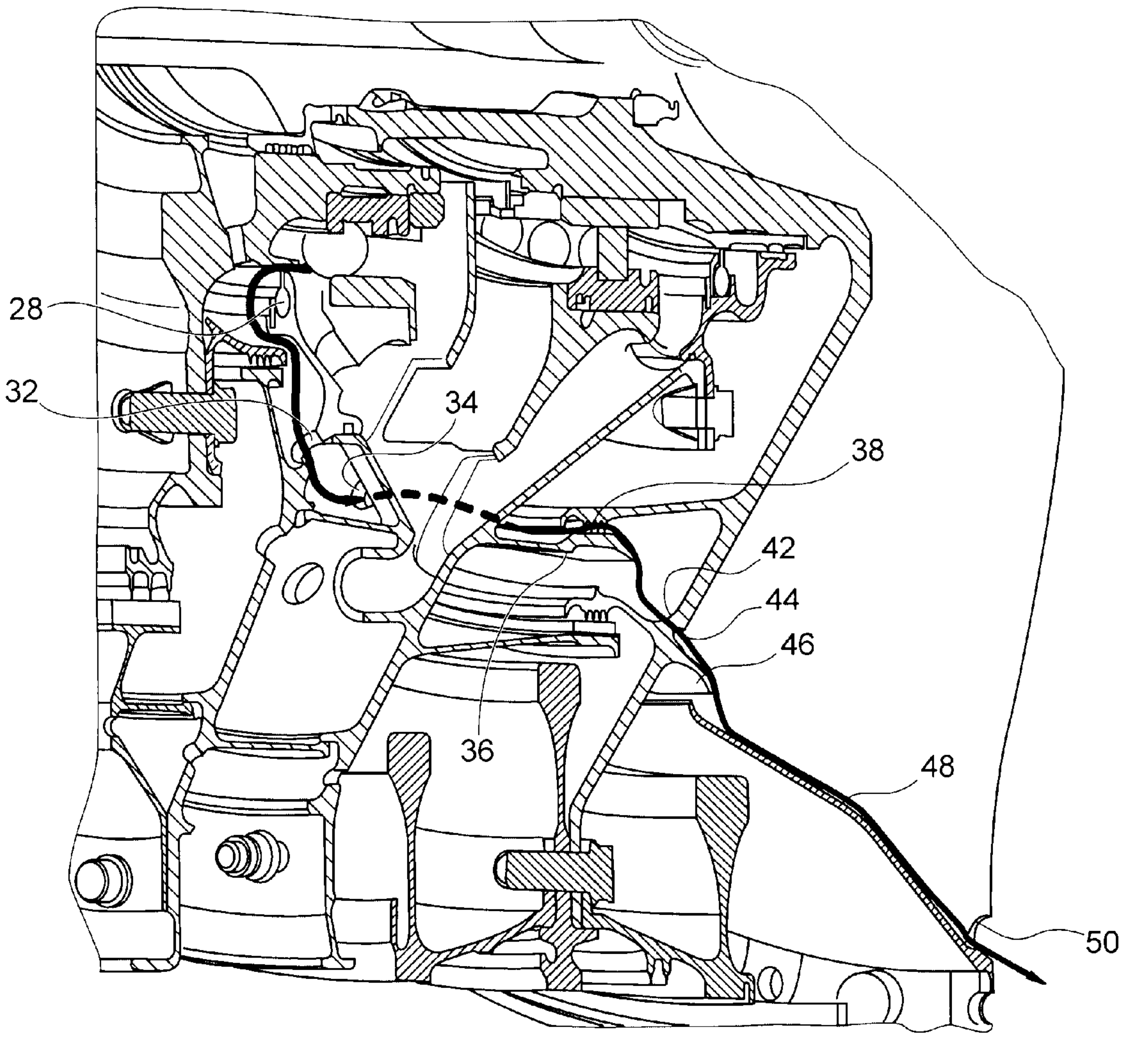
FIG. 3 is a perspective view of an oil recovery device according to the present invention view from the front of the turbojet engine.
Figure 4:
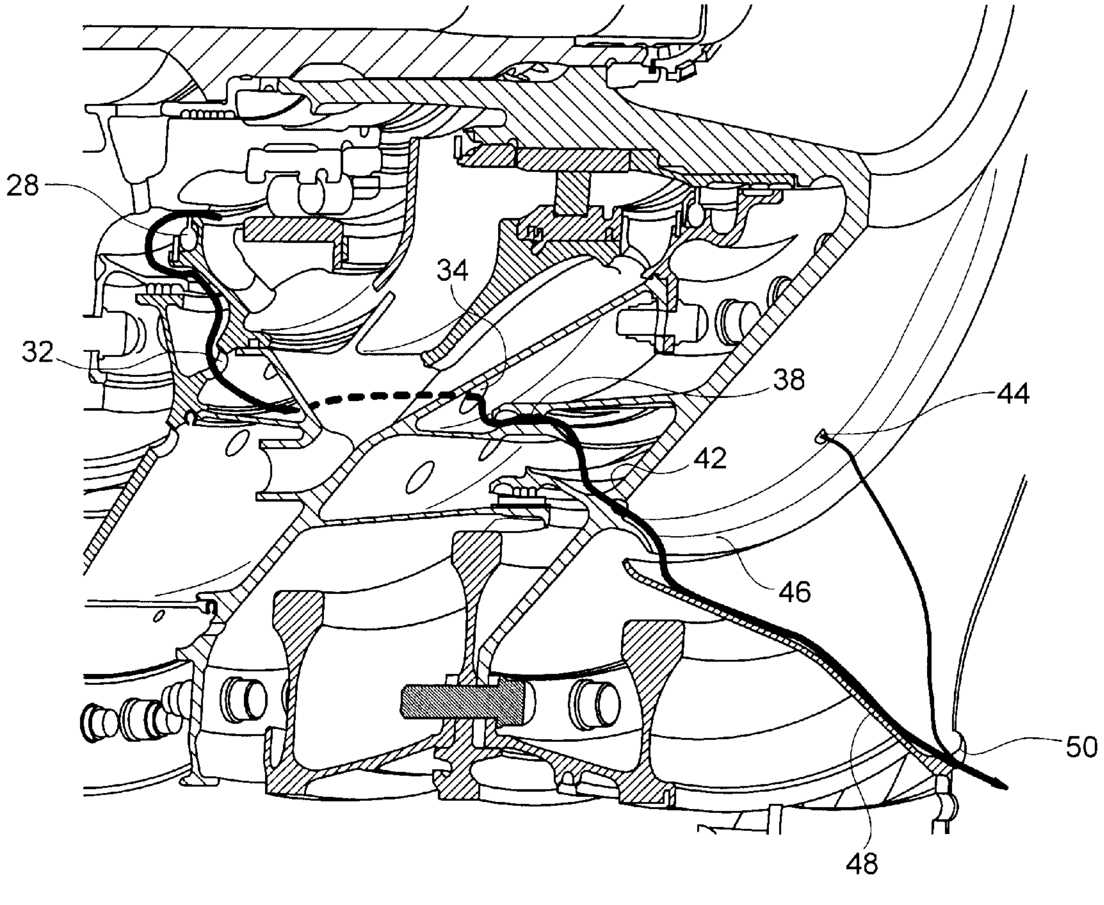
FIG. 4 is a perspective view of the oil recovery device in FIG. 3 viewed from the rear of the turbojet engine.

In FIGS. 3 and 4, a perspective view of the front and a view of the rear of the oil recovery system are represented respectively. The rotating joint 28, the first hole 32 and the second hole 34, the wall 36 comprising the labyrinth seal 38, the cavity 42 comprising conical walls, the hole 44 at the bottom of the cavity 42, whereby the oil is evacuated, and finally the "droplet disperser" tab 46 above one end of the fixed ferrule 48 are identified.

The invention claimed is:

1. An oil recovery device comprising:

an inter-turbine;

an upstream bearing support mounted on an upstream end of the inter-turbine casing at a radially outer end and supporting a first bearing at a radially lower end, the upstream bearing support including a first upper radial shoulder, a second lower radial shoulder, and a first hole disposed radially between the first upper radial shoulder and the second lower radial shoulder;

a downstream bearing support mounted on a downstream end of the inter-turbine casing at a radially outer end and supporting a second bearing at a radially lower end, the downstream bearing support including a first upper upstream extending wall, a second lower upstream extending wall, a third downstream extending wall, and a second hole disposed radially between the first upper wall and the second lower wall, an upstream end of the first upper upstream extending wall abutting the first upper radial shoulder and an upstream end of the second lower upstream extending wall abutting the second lower radial shoulder;

a low-pressure turbine journal mounted rotating with respect to the inter-turbine casing including an upstream extending wall with a seal that cooperates with the third downstream extending wall of the downstream bearing support, and an oil passage hole disposed radially above the upstream extending wall; and a fixed ferrule disposed downstream the low-pressure turbine journal, wherein the first hole, the second hole, the seal, and the oil passage hole present a discharge path to discharge oil from a chamber in which the first and second bearings are provided to the ferrule, the oil being discharged inside the ferrule.

2. The oil recovery device according to claim 1, wherein the low-pressure turbine journal comprises a tab which extends longitudinally above one end of the ferrule in order to discharge the oil by centrifugation at said end of the ferrule and the ferrule is widened from the end whereon the oil is discharged.

3. The oil recovery device according to claim 2, wherein an oil passage is located at a bottom of a cavity formed by conical shaped walls.

4. The oil recovery device according to claim 3, further comprising a rotating joint, and an end of a bearing support wall overhanging the cavity formed by the conical shaped walls.

5. A turbine aero engine comprising an oil recovery device as in any of claims 1-4.

* * * * *

UNITED STATES PATENT AND TRADEMARK OFFICE

CERTIFICATE OF CORRECTION

PATENT NO. : 8,312,702 B2
APPLICATION NO. : 12/364053
DATED : November 20, 2012
INVENTOR(S) : Jacques Rene Bart et al.

It is certified that error appears in the above-identified patent and that said Letters Patent is hereby corrected as shown below:

Column 3, line 24, Claim 1, after "an inter-turbine" insert --casing--.

Signed and Sealed this
Fifth Day of February, 2013

Teresa Stanek Rea
*Acting Director of the United States Patent and Trademark Office*